F. W. PARE & A. H. CLARK.
BOBBIN AND CARRIAGE OF TWIST LACE MACHINES.
APPLICATION FILED AUG. 17, 1912.

1,268,144.

Patented June 4, 1918.
5 SHEETS—SHEET 1.

Witnesses
Wm J Jones
Albert F Henman

Inventors
Frederick W. Pare &
Albert H. Clark
by Wm Wallace White
atty.

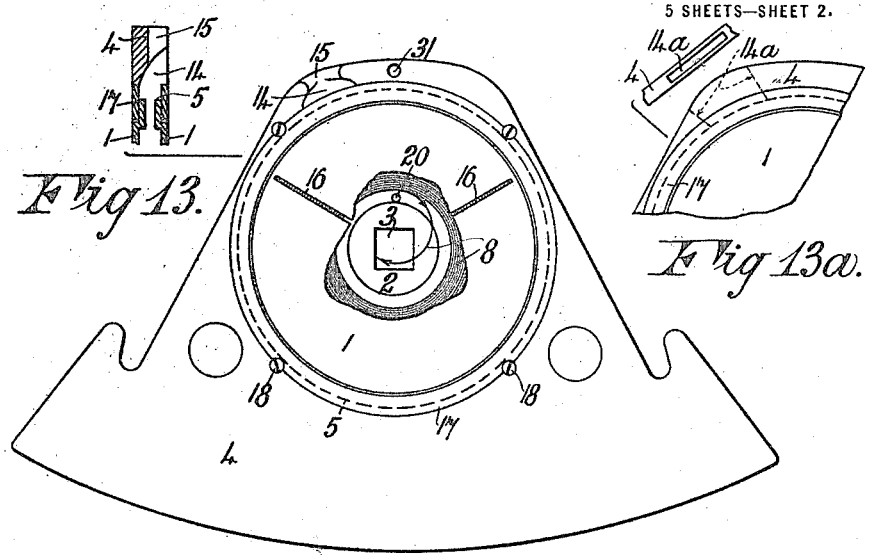
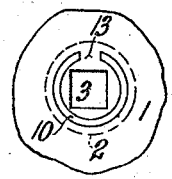
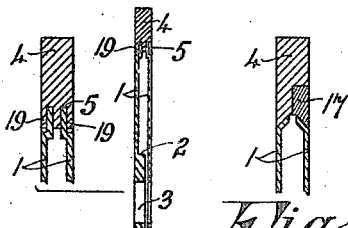
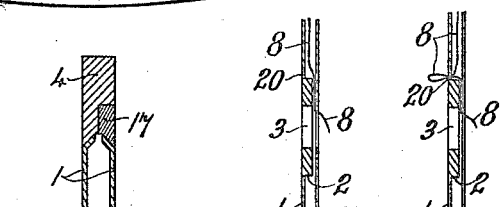
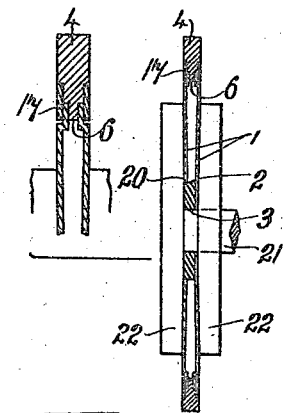
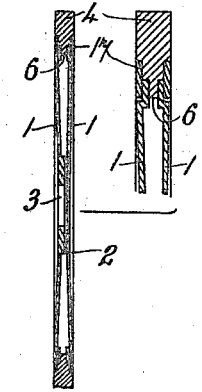
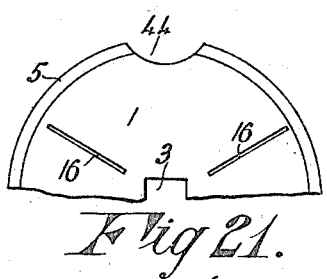

F. W. PARE & A. H. CLARK.
BOBBIN AND CARRIAGE OF TWIST LACE MACHINES.
APPLICATION FILED AUG. 17, 1912.
1,268,144.
Patented June 4, 1918.
5 SHEETS—SHEET 3.
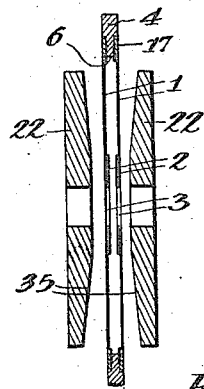
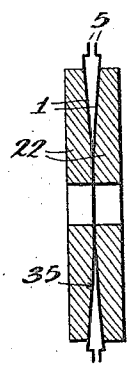
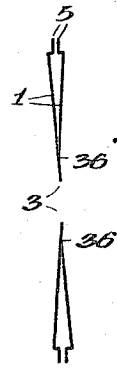
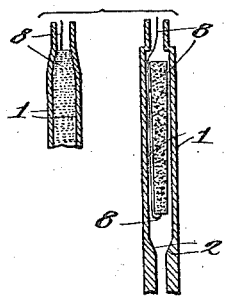
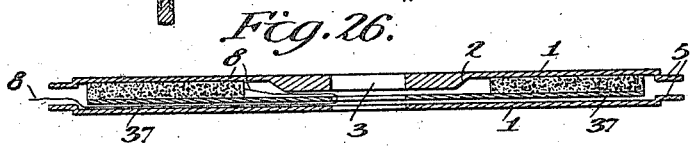
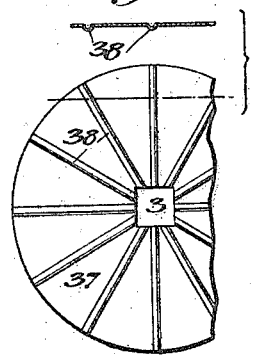
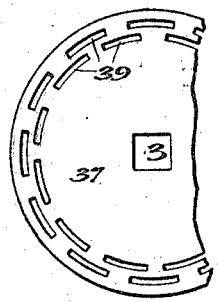
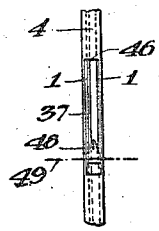
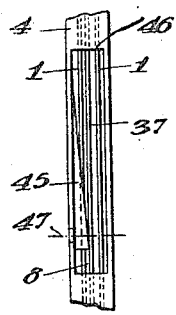
Inventors:
Frederick W. Pare
Albert H. Clark

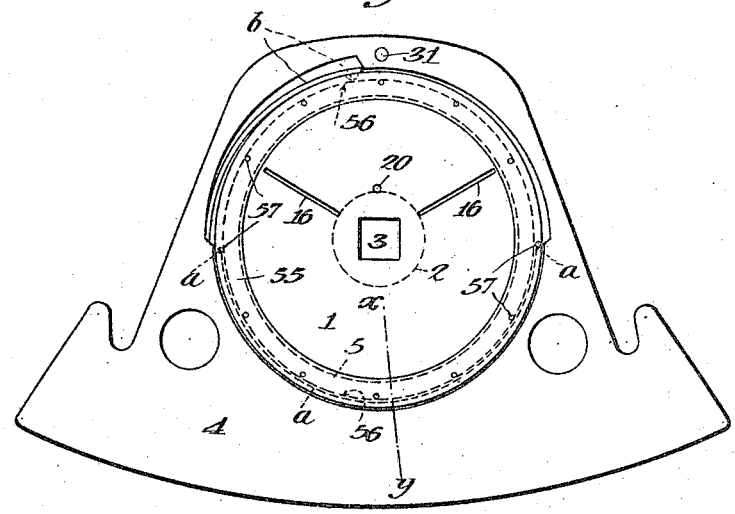
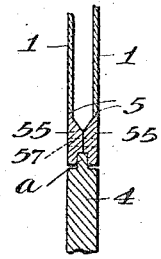
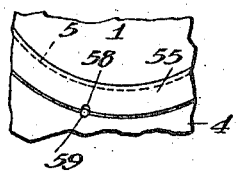
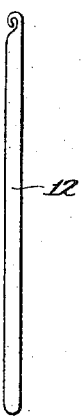
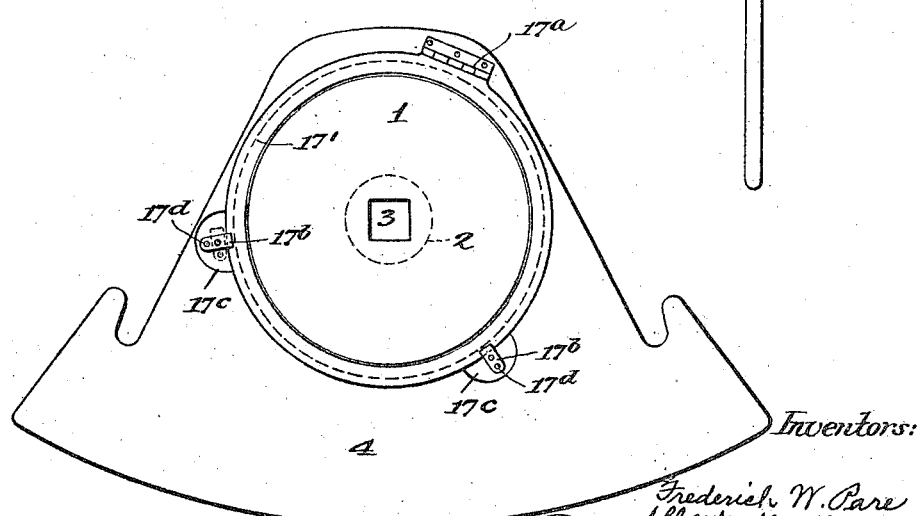

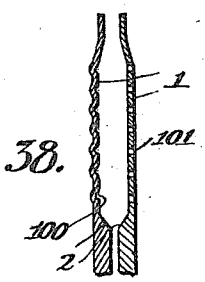
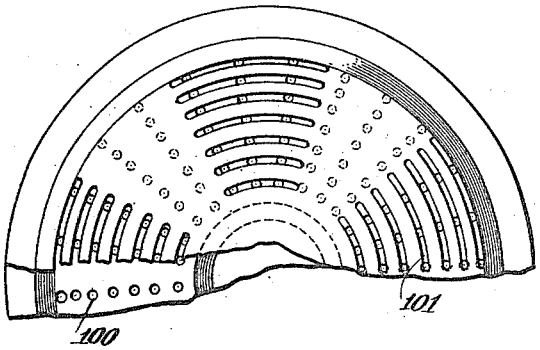
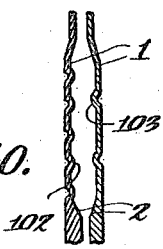
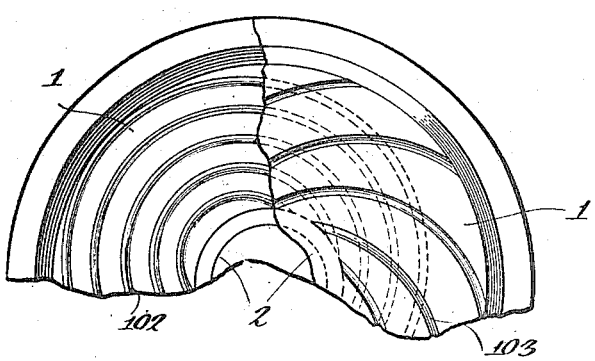
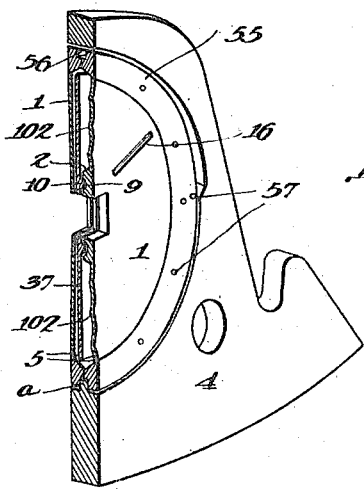

UNITED STATES PATENT OFFICE.

FREDERICK WILLIAM PARE, OF NOTTINGHAM, AND ALBERT HENRY CLARK, OF LINCOLN, ENGLAND; SAID CLARK ASSIGNOR OF ONE-HALF OF THE WHOLE TO SAID PARE.

BOBBIN AND CARRIAGE OF TWIST-LACE MACHINES.

1,268,144.   Specification of Letters Patent.   Patented June 4, 1918.

Application filed August 17, 1912. Serial No. 715,614.

*To all whom it may concern:*

Be it known that we, FREDERICK WILLIAM PARE and ALBERT HENRY CLARK, both subjects of the King of Great Britain, citizens of Nottingham and Lincoln, respectively, residing at Nottingham and Lincoln, England, respectively, have invented new and useful Improvements in or Relating to the Bobbins and Carriages of Twist-Lace Machines, of which the following is a specification.

This invention has reference to bobbins and carriages of twist lace machines and has for its object an improvement in the bobbin and carriage whereby the thread may be wound substantially in the ordinary way upon an inclosed bobbin devoid of exposed flanges, and yet be readily drawn from the center of the supply and without rotating the bobbin, thus allowing of a practically constant tension; the quantity of yarn which may be carried by the bobbin is increased; and means are also provided by which the quantity of yarn upon the bobbin may be readily seen while the bobbin is in the carriage, said means being also of use for other purposes as will be described later.

Various modifications may be made in the methods of threading the bobbin for winding and in the methods of drawing off the thread from the wound yarn supply, all of which will be hereinafter described.

In order that the invention may be clearly and readily understood, reference will be made in the following further description to the accompanying drawings, wherein—

Figure 3:
Figure 7:
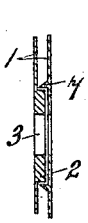

Figs. 3, to 7, are vertical sections through the center portion of the bobbin and show various forms of the hub.

Figure 8:

Fig. 8, illustrates sectionally one method of drawing off the thread from the interior of the wound yarn.

Figure 9:
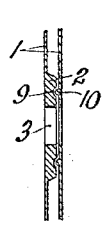

Fig. 9, is a vertical section showing one form of means for preventing the yarn from passing between the center parts of the two bobbin plates during winding.

Figure 10:
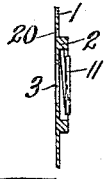

Fig. 10, is a sectional view, and

Figure 11:
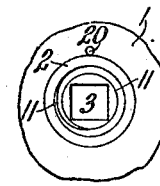

Fig. 11, a front view showing a bobbin hub furnished with one form of device for clearing out ravels from the thread during drawing off.

Figure 12:
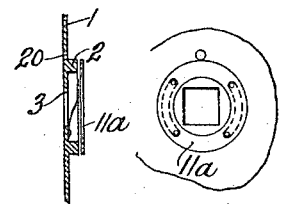

Fig. 12, is a sectional and front view showing another form of ravel clearing device.

Fig. 13, is a front elevation (partly sectional) illustrating a method of uncoiling the yarn from the interior of the supply during drawing off.

Fig. 13$^a$, illustrates the provision of an opening in the carriage for bobbin threading and feeding purposes.

Fig. 14, shows the clearway formed through the projecting means on the hub face for the insertion of the threader device between the bobbin plates.

Figs. 15, and 15$^a$, illustrate modifications in the manner of mounting the bobbin plates in the carriage.

Fig. 16, shows one method of threading the bobbin.

Fig. 17 illustrates another method of threading.

Fig. 18, shows in vertical section a method of pressing the bobbin sides or plates together during winding.

Fig. 19, shows a form of bobbin wherein the sides are normally dished or hollowed inward.

Fig. 20, shows a modification in the arrangement of the spindle and drawing off holes of the bobbin.

Fig. 21, shows a portion of one of the bobbin plates provided with a concavity in its edge for a purpose hereinafter described.

Fig. 22, shows in vertical section the modification wherein the bobbin is composed of thin plates adapted to be bulged inward by shaped washers, the bobbin being shown in the normal condition.

Figs. 23, and 24, show two forms of hubless bobbins in the compressed condition as when winding.

Fig. 25, shows a wound bobbin in vertical section the thread being drawn off between the wound yarn and one bobbin side.

Fig. 26, is a similar view to the preceding one illustrating the provision of a middle plate between the bobbin sides.

Figs. 27, and 28, show modifications in the construction of the middle plate of the bobbin of Fig. 26.

Fig. 29, is an edge view of part of the carriage and shows a form of tensioning device for the middle bobbin plate.

Fig. 30, is a similar view showing a modified form of the tension device.

Fig. 31, similarly shows an adjustable device for tensioning the thread during drawing off.

Fig. 32, is a front elevation of a form of bobbin and carriage wherein the bobbin is removable from the carriage.

Fig. 33 is a section on the line x—y of Fig. 32.

Fig. 34, illustrates a method of preventing rotation of the bobbin mounting case within the carriage.

Fig. 35, illustrates a threader device.

Fig. 36 shows a modification of the bobbin retaining means.

Fig. 37 is a front elevation of a bobbin, partly broken away, showing two modifications of means for preventing internal collapse of the yarn during unwinding.

Fig. 38 is a transverse sectional view of the bobbin as shown in Fig. 37.

Fig. 39 is a front elevation, similar to Fig. 37, of a bobbin having further modified forms of collapse-preventing means.

Fig. 40 is a sectional view of the bobbin as shown in Fig. 39.

Fig. 41 is a perspective view, partly in section, of a single form of the device which includes all of the essential improved features of the invention.

Parts of Figs. 2, 13, 15, 18, and 19 are shown enlarged.

Figs. 15ª, 25, 26, 29, 31 and 33 are drawn to a larger scale than the other figures.

Like parts are designated by the same reference characters throughout the drawings.

Referring to the drawings, the bobbin is in split form, i. e., it comprises two separate halves consisting of circular plates 1, one or each of which may be furnished with a concentric and internal hub or boss 2 on the peripheral side of which the yarn is wound. Or the bobbin plates may be without any internal hubs thereon as will be described later.

The bobbin plates 1 are furnished at or near the center thereof with a hole 3 of any suitable shape to enable the bobbin to be placed on or connected with the spindle or other part of a winding engine or other means by which said bobbin may be rotated within the carriage 4 for the purpose of winding the yarn into the bobbin.

The internal yarn storing cavity or space may be formed between the two bobbin plates 1 by separating the latter, i. e., keeping them apart, and this may be effected in any suitable manner. For instance, the bobbin sides 1 may be kept apart by the hub or hubs 2, that is to say, the winding hub or hubs may be of such depth as to prevent the bobbin sides meeting or the circumferential edges 5 of the plates may be separated by a flange, ring, or one or more nibs 6 on the carriage 4, Fig. 2.

The bobbin plates may or may not be provided circumferentially with angular bent-in flanges, but preferably are so formed (Fig. 2) in order that the means, hereinafter described, which overlap the circumferential edges 5 of the plates and are employed to retain them in the carriage 4, need not project beyond the plane of the outer face of the bobbin plates or side.

During the winding of the bobbin, the yarn thread passes in between the rotating bobbin plates at the periphery thereof as will be described later.

Figure 2:
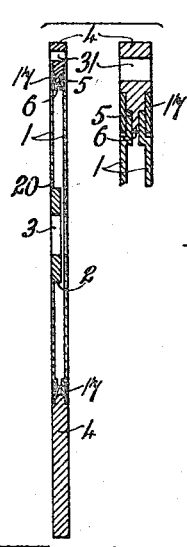
Fig. 2, is a vertical central section of the same.
Figure 4:
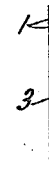

The winding hub or boss 2 on one or each bobbin plate 1 may be of any shape most suitable for receiving the yarn on the side or sides thereof. For example, the winding surface or side of the hub or boss may be flat and at right angles to the side of the bobbin, as shown in Fig. 2, or said hub side may be curved convexly (Fig. 3), or concavely (Fig. 4). By preference, however, the hub or boss side is of beveled or inclined formation relatively to the bobbin sides, such as in Fig. 5 or Fig. 6, the advantage of this formation being that when commencing to draw off the yarn from the center of the supply, the first few coils will come away easily.

According to one convenient construction (Figs. 7 and 8) one of the bobbin sides 1 may be furnished on its inner face with a sleeve like boss or projection 7 the outer circumferential side or surface of which, being by preference inclined, is adapted to receive the yarn 8 thereon. The opposite bobbin plate 1 is furnished on its inner face with a hub 2 which extends within the winding boss 7 on the adjacent bobbin side sufficient space being left between the outside of the said hub 2 and the inside of the said boss 7 for the passage of the yarn for drawing off purposes, as shown in Fig. 8.

During winding the two bobbin sides 1 are, in a manner hereinafter described, pressed toward each other so that the winding boss 7 is brought into contact with the opposite bobbin side to prevent the thread passing between the two bobbin plates. After the bobbin has received its supply of yarn the two bobbin sides may be slightly separated at the center to permit of the withdrawal, i. e., drawing off, of the yarn between the two halves the thread being drawn out through the spindle hole 3 or other hole or holes (or, as will be described later, through an inspection slot) in one of the bobbin sides, as shown for example in Fig. 8. The separation of the bobbin sides for the purpose just mentioned may be effected, after the beforementioned applied pressure on the two bobbin plates for winding purposes has been removed, either by the natural inherent spring of the plates (they having been deflected or compressed from their normal position of separation by washers during winding), or by the natural lateral expansion of the wound yarn 8 between the bobbin plates, or by the forcible passage of the yarn between the two plates during the drawing off of the yarn.

The arrangement just described in which the hub 2 on one bobbin plate is located within the boss 7 on the adjacent plate effectively prevents the yarn from passing down between the two plates during winding, but if desirable, and according to another form, the hub referred to may be dispensed with the contact of the boss with the opposite bobbin plate being relied upon to prevent the yarn slipping down between the two plates.

Figure 5:
Figure 6:

Another arrangement of winding hub may consist of a hub or boss 2 on each bobbin plate or side 1, as shown in Figs. 5 and 6, the peripheral sides of said hubs being inclined, beveled, or curved or otherwise suitably shaped to receive the yarn thereon. In this construction the yarn in being drawn off from the supply would pass between the adjacent faces of the hubs, which latter would be separated after the completion of the winding operation in the same manner as that hereinbefore described, the yarn passing out of the bobbin through the spindle hole 3 or other suitable hole or holes in one of the bobbin plates.

As a further or alternative means of preventing the thread when being wound upon the bobbin hub or hubs from slipping over the face of the said hub or hubs and between the bobbin plates, the faces of the hubs or of the hub and bobbin plate may be provided with a bead, ring or other projection adapted to diminish locally the space between the said parts. In a modification (Fig. 9) and additionally to or instead of the above mentioned feature, one of the adjacent faces, i. e. of the hubs or hub and bobbin side may be recessed, dished, or grooved as at 9 to receive therein a suitable projection 10 on the opposite face of the contiguous part when the two parts are pressed together during winding.

There may be provided on the face of one of the hubs 2 or the bobbin side 1 between which the thread passes when being drawn off, a device (such for example as a circular spring or spring ring 11—Figs. 10 and 11—) having a fine edge, or a spring pressed washer 11ᵃ (Fig. 12) adapted to press upon the opposite face or device thereon between which device and face or between which devices the thread passes. The function of said device or devices is to clear out any ravels which may occur in the thread such for instance as might be caused by two or more coils of the yarn unwinding from the center of the supply at the same time.

For the purpose of introducing the thread between the two halves of the bobbin prior to the commencement of winding, there is preferably employed a threader device which may conveniently take the form of a hooked blade 12 (Fig. 35) adapted to be passed in between the two sides 1 of the bobbin say at the spindle hole 3 or draw off opening and out at a suitable point at the periphery of the bobbin. The thread may then be attached to the hook and the withdrawal of the latter from the bobbin will draw the thread in between the bobbin plates 1 and through the central opening in one side of the bobbin.

The threader blade 12 may consist of a thin flat member hooked as shown in Fig. 35.

When the internal hubs or bosses 2 and 7 of the bobbin plates pass one within the other or overlap, as shown, e. g. in Figs. 7 and 8, or have projections on the faces thereof, e. g. as in Fig. 9, or where the adjacent opposite faces of the bobbin sides are of such formation that there is not a straight or clear passage between the two bobbin plates in the locality of the drawing off center, a channel, groove, or passage 13 (Fig. 14) may be made radially through such obstructing part or parts to permit of the insertion of the threader device.

A clearance space 14 (Figs. 1 and 13) or an opening 14ᵃ (Fig. 13ᵃ) may also be made in the carriage 4 at some convenient point in the locality of the periphery of the bobbin to enable the yarn thread to be secured to the end of the threader device 12 when it is projected through the outer edge of the bobbin in the aforesaid manner. The clearance space 14 or the opening 14ᵃ also provides access to the interspace of the bobbin between the sides 1 at the periphery for thread feeding purposes to the bobbin during winding.

In addition to the said clearance space 14, the side of the carriage 4 may be grooved or channeled as shown at 15 (Figs. 1 and 13) to provide a passage way for the thread when the latter is feeding on to the bobbin so that it may feed straight into the space between the two bobbin sides 1 and thus avoid frictional contact with the side of the carriage or bobbin.

The clearance space 14 or the opening 14ᵃ may also serve to admit of the extension or insertion of the threader device for the purposes of threading for winding or withdrawing.

In one or each side plate 1 of the bobbin there may be formed one or more slots 16 (Figs. 1, 13, and 21) disposed radially from the axis of said plates and of either straight, curved or any other suitable formation. These one or more slots 16 extend across that area of the bobbin which receives the supply of yarn and may be used for inspection purposes whereby the quantity of yarn upon the bobbin may be readily ascertained by observation. The said slots may also be used upon the breakage of the thread for the purpose of recovering the end of the thread in the bobbin said end being hooked out through the slot by the threader or some similar device and then threaded as before.

The rotatable bobbin plates 1 may be mounted in the carriage 4 in any suitable manner and be retained therein by any convenient means.

According to one arrangement, the carriage 4 may have an annular recess on either side into which the circumferential edges 5 of the bobbin plates may respectively fit so as to rotate therein. The said plates may each be kept from displacement from their annular recess by a ring 17 (Figs. 1 and 2) or one or more plates attached to the side or face, or in a recess in the side of the carriage 4 by screws 18 or other means, such ring 17 or plate or plates overlapping the peripheral edges 5 of the bobbin plates.

According to another arrangement, shown in Fig. 15, the bobbin plates 1 may have angular, rabbeted, or flanged peripheral edges 5 located in an annular undercut groove in the carriage said plates being prevented from lateral displacement by the overlapping sides 19 of the groove. In this construction the carriage 4 may be made in halves or any other suitable number of sections and adapted to be built up and secured together in any suitable manner so as to inclose the bobbin plates within the carrying groove. Or another manner of introducing the bobbin plates might be by making one side of the carrying groove in the form of a removable ring 17 (Fig. 15$^a$) said ring being similar to the ring 17 of Fig. 1.

The devices which retain the bobbin plates 1 within the carriage 4 may be of such a character as to enable one or both the said plates to be removed very easily when required. When the said bobbin fastening means are to be such as to permit of easy removal of the bobbin plates or either of them, said means may be hinged, pivoted, or be otherwise movably attached to the carriage. For example, as shown in Fig. 36, the ring 17' may be hinged at 17$^a$ to the carriage so that it may be opened. When closed the hinged ring may be fastened by one or more pivoted members such as 17$^b$. Or the members 17$^b$ may operate direct on the bobbin plates to retain them within the carriage. The members 17$^b$ are located in cavities or recesses 17$^c$ in the carriage. A projection 17$^d$ on the underside of the pivoted members enters a hole (not apparent in Fig. 36) in the carriage to retain the members in the operative position.

The means for retaining the bobbin plates 1 within the carriage 4 are preferably constructed and arranged in such a manner that they do not project beyond the level or plane of the carriage face or the outer side of the bobbin, thus avoiding any projecting edge which might cut out threads during the traverse of the carriage in the lace machine. For instance, in the form shown in Figs. 1 and 2 the retaining ring 17 is sunk in a recess in the side of the carriage so as to be level therewith.

In the operation of winding the yarn upon the bobbin, the yarn thread is passed between the bobbin plates 1 by means of the before described threader hook 12, or otherwise, the end of the thread 8 being drawn either between the faces of the hubs, or hub and bobbin plate and out through the spindle hole as shown in Fig. 16, or out through another hole such for example as the hole 23 (Fig. 20), or the end of the thread may, as shown in Fig. 17, be drawn through a threading hole 20 formed through one side of the bobbin and located at a point contiguous with the winding surface of the internal hub or hubs, see Figs. 1, 2, 13, 16, 17, 18 and 20.

The bobbin is then mounted upon or attached to the spindle 21 of a winding engine or similar apparatus and during the rotation of the bobbin within the carriage for winding purposes the two bobbin plates 1 are pressed inward i. e., toward each other so as to bring the faces of the hubs or hub and bobbin plate into contact as aforesaid, and as shown in Fig. 18. The end of the thread 8 is held either between the contacting faces just mentioned, or if it is passed through a threading hole 20 it is held by the pressure between the bobbin plate 1 and the presser device of the winding engine which comes into contact therewith. These pressure devices may consist of washers or plates 22 which by preference, are of such a diameter that they will not only press the bobbin plates together in the center locality of the winding hub 2 but will also apply pressure to that area of the bobbin sides which internally receives the supply of yarn. Conveniently for this purpose the winding washers may be approximately equal to or a little less than the internal diameter of the retaining rings or flanges 17. This lateral pressure in opposite directions during winding prevents the yarn, which accumulates upon the hub, from causing a lateral expansion or outward bulging of the bobbin sides 1.

In order to prevent the central portions of the bobbin sides from being bulged outward or expanded laterally beyond the face or plane of the carriage 4 by the lateral expansion of the wound yarn between the two bobbin sides 1 when the bobbin is removed from the winding engine, one or both bobbin sides may be dished or hollowed inward on the outside face so that the central portion will be normally sunk below the level or plane of the carriage or outer edge of the bobbin, such for example as represented in Fig. 19, and thus allow for the outward lateral expansion to take place within the width of the carriage or bobbin. When the bobbin is thus formed, the washers or plates 22 of the winding engine may be shaped on their faces to suit the bobbin sides.

During the rotation of the bobbin and the winding of the yarn upon the internal hub or hubs 2 thereof, the thread passes into the bobbin between the separated peripheral edges 5 of the side plates at the point 14 on the carriage where provision is made for the access of the yarn to the bobbin as before described.

After the yarn has been wound on the bobbin, the end first threaded through the spindle hole 3 is left therein so that the thread may be drawn off from the center of the supply through said hole, or if the end of the yarn has previously been threaded through the threading hole 20 the said thread may be withdrawn from said hole and passed through the spindle hole 3 or if, as may be the case (Fig. 20) the spindle hole 3 does not occupy the axis of the hub, through a central hole 23 or other hole or holes in the part of the hub not occupied by the spindle.

In drawing off the yarn from the wound bobbin the pull upon the end of the thread through the spindle hole or other central hole 23 causes an uncoiling of the yarn to take place in the interior of the wound supply. This is represented in Fig. 13 where the yarn 8 is shown uncoiling around the hub 2 and passing from the interior of the supply through the spindle hole 3 of the bobbin.

After passing out through the spindle hole or other central hole in the bobbin hub, the thread 8 is passed through a tension device which may be of any suitable construction and arrangement and may be mounted in any convenient position on the bobbin plate or hub or on the carriage.

To facilitate the traverse of the carriage 4 and prevent the bobbin and warp and beam threads from clinging together during the passage of the carriage from comb bar to comb bar, the tension device, winding or drawing off hole and carriage thread hole may be so arranged that the line taken by the thread outside the bobbin or carriage will be more or less transverse or at an angle to the warp and beam threads.

For the purpose just mentioned the thread may pass through an additional hole or eye 33 in the carriage 4 said thread being conducted along depressions 32 and 34 in the bobbin plate 1 and carriage side 4 respectively.

Figure 1:
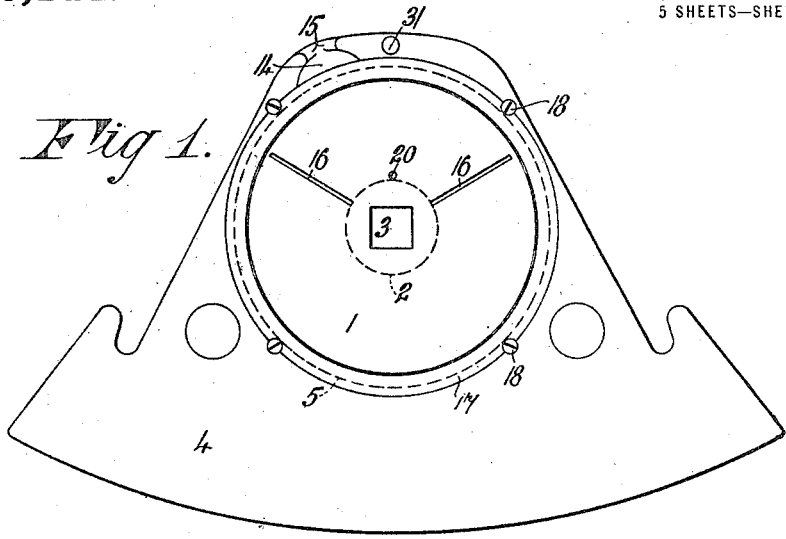
Figure 1, is a front elevation of one form of bobbin and carriage constructed according to this invention.

In like manner, the one or more inspection slots 16 in the bobbin may be radially disposed in such a manner (for example as shown in Figs. 1 and 13) that they will present themselves endwise or angularly to the warp and beam threads so as to avoid cutting the same.

The bobbin may, upon the completion of winding, be moved around in the carriage if necessary to bring any device thereon or part thereof e. g. the thread race or tension device into proper relationship to any device on or part of the carriage for drawing off purposes, or on cessation of winding the bobbin may be left in any determined relation to the carriage.

When the thread is to be carried from the spindle hole or other access hole in the bobbin side to and through a drawing off hole or the hole under a tension device, a slit (not shown) may be provided between said holes so that the thread may be passed from one hole to the other, thus avoiding threading.

According to a modification (Figs. 22 to 24) the two plates 1 forming the bobbin sides may be normally flat externally as shown in Fig. 22, but may be of sufficiently thin substance so that when lateral pressure is applied on opposite sides of the bobbin by washers 22 on the winding spindle said washers having conical, convex or other shaped surfaces 35, the bobbin sides 1 will bulge inward and thus produce a yarn receiving space which is narrower in the locality of the bobbin center than it is at the outer circumference.

Such bobbin plates or sides 1 may or may not have a central inner hub 2 (Fig. 22) and when not so (Fig. 23), the centers of the plates may be pressed inward by the washers 22 on the winding spindle until they meet as shown, and thus at their point of meeting form a hub upon which the yarn may be wound. One bobbin plate may be provided with a central circular hole 36 (Fig. 24) of somewhat larger diameter than the hole in the other plate into which larger hole 36 the central portion of the other plate may be pressed conically by the shaped washers 22 so as to eliminate as far as possible the passage of the yarn thread between the central meeting portions of the bobbin plates 1 during winding.

The yarn is wound in the bobbins by rotating the latter in their carriages in the manner hereinbefore described, and upon withdrawal of the winding spindle washers 22, after the completion of the winding operation, the bobbin plates 1 may either slightly separate i. e., expand laterally or they may revert to their normal flat condition thus allowing the thread to be drawn off with greater or less ease (according to the original setting of the bobbin plates and washers for winding) from the center of the yarn supply between it and one of the bobbin plates and out from between the bobbin sides at the circumference as shown in Fig. 25 or, as will be described later, through a threading hole in one of the bobbin sides. The passage of the thread from the center of the supply between the latter and the bobbin side produces a dragging and ravel combing-out tension. Where, as just described with reference to Fig. 25, the yarn is withdrawn between the supply and bobbin plate, it may be found advantageous to employ a bobbin having a margin contracted internally as indicated in the annexed detail view of said Fig. 25. In this form the yarn supply would be of reduced width where wound into the contracted margin of the bobbin, that is to say, the wound yarn would have a less number of coils widthwise at its outer circumference than elsewhere. Consequently the pressure of the wound yarn upon the drawing off thread for tensioning would be maintained until the bobbin was practically empty seeing that the lateral compactness of the yarn supply at the circumference would not be broken until but a small quantity of yarn remained.

In another modification (Fig. 26) a third plate 37 is located between the two bobbin sides 1, the yarn 8 being wound between this central plate and one side of the bobbin, then instead of the yarn thread when being drawn off passing between the yarn supply and the bobbin side as in Fig. 25, it is passed between the central plate 37 and the adjacent bobbin side 1 as shown. In this case the wound yarn will press the center plate 37 against the adjacent bobbin plate and thus put a dragging and combing-out tension on the thread as it passes between the said two plates.

Or the central plate 37 may be provided on the side adjacent to the bobbin plate 1 between which latter and the central plate the yarn is to be withdrawn, with radial projecting ridges such as 38 (Fig. 27) or similar means for the purpose of slightly separating a portion of the central plate 37 from the bobbin side 1 so as to form a clearway or clearways for the withdrawal of the thread.

Or the central plate 37 may have a slot or a series of overlapping slots such as 39 (Fig. 28) formed therein near its circumferential edge whereby the wound thread may protrude through the plate and make contact with the bobbin side. The thread being withdrawn may pass between said protruding yarn supply and the bobbin side so that it is thereby tensioned.

In a further modification the thread may be wound upon a temporary hub $40^a$ projected through the center of the bobbin said hub, after winding, being withdrawn to enable the thread to be drawn off from the center of the supply by uncoiling as aforesaid.

When it is intended to draw off the yarn thread either between one side of the bobbin and the wound yarn or between one side of the bobbin and a central plate as hereinbefore described with reference to Figs. 25 and 26 respectively, the thread is drawn across and between the bobbin plates, deflected where hubs are used by such hubs and where no hubs are used by the spindle or spindles or some parts thereof, to a concavity 44 (Fig. 21) in the periphery of one of the bobbin plates 1. For winding purposes the free end of the thread is passed over the peripheral concavity and thence over the outside of the bobbin plate so that it may be held between the latter and the washer 22 of the winding spindle. When the bobbin comprises three plates as in Fig. 26, the thread is laid first between the two plates where the yarn supply is to be wound and then between the central plate and the other bobbin plate (furnished with the aforesaid concavity 44) for withdrawal purposes.

Another method of withdrawal where a central or intermediate plate is furnished in the bobbin may consist in drawing the thread from the interior of the yarn supply through a slot (the same or similar to the slots 16) in said center plate and then out between the center plate and adjacent bobbin plate as before.

When a slot is furnished in the middle bobbin plate as just described, the outer bobbin plate or plates would also have a slot so that access may be had therethrough to the slot in the middle plate for threading and inspection purposes. See Figs. 13 and 22.

The threading of the yarn thread may be effected by means of a threading device, such for example as that previously described.

It is found in practice that under the method of winding into and withdrawing from two separable bobbin plates the wound yarn tends to collapse internally that is to say, the inner hollow circumference of the yarn supply instead of retaining its circularity to anything like a reasonable extent, buckles or collapses inward and thereby renders drawing off from the center of the yarn supply with regularity and without ravel and dragging forward of coils out of their order of winding, impossible, or unduly difficult.

To remedy the aforesaid disadvantage of the collapse of the yarn supply means may be provided on or in one or more of the bobbin plates said means being intended to hold back the coils of wound yarn to prevent their collapse.

These means may be in the form of cuts, slits or other apertures or grooves, indentations, pittings or depressions into which the wound yarn may extend or press, (see Figs. 37 and 38) or ridges or embossments or other projections which may extend or press into the wound yarn (see Figs. 39 and 40) with intent to prevent or limit the movement of the yarn coil on the parting of the bobbin plates and consequent release of the yarn coil from their pressure.

These means may be disposed more or less radially in or on the bobbin plate or plates, or they may be arranged more or less circularly or circumferentially in a concentric, eccentric, spiral, or other suitable manner, or again, the bobbin plate may have means disposed in both more or less radial and more or less circular directions if desired.

These yarn holding means may be furnished on or in one or both of the plates of the bobbin between which the yarn is wound.

In Figs. 37 and 38 two modified forms of yarn-sustaining, or collapse-preventing, means are illustrated. The plate at the left (Fig. 38) is provided with indentations 100, whereas the plate at the right has slots 101 therein. The ridge construction is shown in Figs. 39 and 40, eccentric ridges 102 being provided on the plate at the left (Fig. 40) and spiral ridges 103 on the plate at the right. All of the modifications in construction and arrangement which have just been described are thus disclosed in these figures of drawing.

Where, as previously described with reference to Fig. 26, the yarn thread during drawing off is passed between a central plate 37 and adjacent bobbin side 1 the lateral pressure or expansibility of the yarn supply pressing the plate 37 into contact with the bobbin side to tension the intermediate thread, means may be provided for tensioning the central plate and the co-acting bobbin plate independently of the pressure of the yarn supply the object of this provision being to obviate variation in the tension when applied to the thread by the yarn supply which variation is likely to occur when the yarn supply diminishes as the result of being drawn off for use.

By the provision of such means a more uniform tension may be maintained on the drawing off thread until the whole of the yarn supply has been used.

To this end, the middle plate 37 and co-acting outer bobbin plate 1 may be forced into contact, preferably in the line of passage of the drawing off thread, at selected points by pressure applied to the middle plate 37 or said outer plate 1 by screws, adjustable shaped cams or the like. The pressure bearing for such means may be obtained from the carriage or flange or (when applied to the middle plate) from the opposite or more distant bobbin plate.

Two concrete forms of this are shown in Figs. 29 and 30. In Fig. 29, a wedge shaped cam 45 located in a space or opening 46 in the thickness of the carriage 4 is rotatable about an axis 47. The cam 45 is rotatable in such a manner as to admit of complete withdrawal from the bobbin during winding, and of greater or less depression into the bobbin during drawing off. In this form the cam 45 applies pressure to the outer bobbin flange or plate 1 pressing it into contact with the middle plate 37 thereby tensioning the intermediate drawing off thread 8. The pressure bearing of the cam is obtained from the carriage i. e., the side of the opening 46.

In the form shown in Fig. 30 a wedge shaped cam 48 located in an opening 46 in the carriage 4 is rotatable about an axis 49 thereby penetrating to a greater or lesser extent between the plates 1 and 37 of the bobbin. In this case the pressure bearing of the cam 48 is obtained from one side flange 1 of the bobbin the middle plate 37 being pressed against the other side flange 1 to tension the intermediate drawing off thread 8.

In each of the forms just described the adjusting cams may be rotated by means of a screw cut (not shown) in the end of the axis pivot in which a screw driver may be engaged, or by any other suitable means.

A form of tensioning arrangement applicable to both the methods of drawing off previously described with reference to Figs. 25 and 26, is shown in Fig. 31 and comprises two springs 50 located within and attached one on each side of an opening 51 in the carriage or in the flanges of same or in the mounting case, said springs being normally in contact for tensioning the drawing off thread 8 passed between them. The tensioning springs 50 may or may not extend inward so as to be located partly between the bobbin flanges. The springs may be parted or caused to press more lightly one against the other for tension varying purposes by means of a wedge-shaped or inclined cam or slide 52 suitably arranged so that it may be moved relatively farther in or out between the springs 50. The adjusting member 52 may, as shown, be slidably arranged by means of screws or pins 53 and slots 54 or it may be pivoted for the purpose described, or instead of two opposed springs one flange or side of the carriage may be opposed by a single spring.

In another form of the invention, the bobbin may be mounted removably in the carriage by surrounding the bobbin with a carrying rim or mounting case consisting, as shown for example in Figs. 44 and 45, of two rings or flanges 55 fastened together so that they overlap the peripheral edges 5 of the bobbin plates 1. The said carrying rim may be provided with a recess or groove 56 in the lower portion thereof adapted to fit upon the projecting verge or inner nib *a* on the ordinary type of carriage the carrying rim being held in place at the top by the usual spring nib *b* or equivalent such as a stout short spring. The rings or flanges 55 of the carrying rim may be fastened together in any suitable and convenient manner, such for example as by rivets 57.

During winding the bobbin will rotate within the carrier rim 55 the latter being prevented from rotation by the engagement of one or more projections (for instance one or more of the rivets 57) on the rim with some part or parts of the carriage (for instance the ends of the verge *a* as shown in Fig. 32), or one or more recesses such as 58 (Fig. 34) in the rim may engage a projection or projections such as a pin 59 or pins on the carriage. Any other means may be brought into use to prevent rotation of the bobbin carrying rim within the carriage during the rotation of the bobbin within the rim.

The bobbin is removed by detaching the mounting case from the carriage said case being attached and detached in the same manner as an ordinary bobbin.

It is found in practice that to avoid raveling on drawing off, the yarn is advantageously dressed or prepared with lard by being run through a larded cloth or similar device. Also it is preferably not drawn out through a central hole in the bobbin but from the top of the center of the yarn supply previously passing thereto from the interior of the supply either between the yarn supply and bobbin plate or through a slot into which the thread has been laid for winding; this slot might be taken in the intermediate plate in which case being covered over by the external plates except at the circumferential end the difficulty of the thread looping outward into the plane of the warp threads would not arise.

It will be obvious that by the provision of a split bobbin the circular edges 5 of the two halves of which are rotatably mounted in an inclosed manner in the carriage the latter having a clearance space or opening e. g., 14, 14ª, to provide access at a convenient point to the separated peripheries of the two bobbin sides, it becomes possible to wind in the accustomed manner into or upon a bobbin devoid of exposed flanges, in consequence whereof the bobbin cannot cut out the warp or beam threads in the passage through the lace machine and by the provision of an available clearance for the passage of the thread over one end of the hub, during drawing off to unwind the thread (so wound as described) from the center of the supply without rotating the bobbin, in consequence whereof the thread may be drawn off from start to finish without variation of the tension thereof, and in further consequence as the diameter of the bobbin may be much larger and its hub much smaller than is practicable where the bobbin is rotated during unwinding either with or without a tension or braking device operating thereon, the capacity of the bobbin may be increased.

It has been previously proposed in a bobbinless carriage wherein the yarn is contained in the form of a cop or where the yarn is wound into the carriage by rotating the same, to draw off the yarn from the interior of the yarn supply. In such a carriage it is also known to provide a tension device situated and arranged near the central drawing off hole in the carriage, and further, a groove or slot has been formed radially in the back of the carriage to provide a clearway for the passage of the drawing off thread between the central hole and thread eye in the carriage. Also it has been proposed to provide a carriage with a bobbin hub rotatable therein for winding purposes said bobbin hub being also rotated as the thread is unwound.

A carriage has also been furnished with a fixed bobbin upon which latter the thread has been wound by positively rotating the carriage, the thread being unwound from the outer circumference of the yarn supply and drawn off through a central hole without rotating the bobbin.

In Fig. 41, the carriage 4 is represented as having mounting means for the bobbin plates of the preferred form shown also in Figs. 32 and 33. The preferred form of hub-forming device and means for covering the joint between the hub projection and the opposite plate, shown also in Fig. 9, is included in this composite form of the device. Likewise, it has the intermediate plate of Fig. 26, the slightly dished outer bobbin plates of Fig. 19, the inspection slot of Fig. 1 and others, and the ribs on a bobbin plate for preventing internal collapse of yarn shown in Figs. 39 and 40. This is the preferred form of complete device.

What we claim then is:—

1. In combination, a bobbin carriage for twist lace machines having a cage, a bobbin rotatably mounted within the cage and comprising independently movable side plates disposed so as to provide a yarn space therebetween, the said bobbin being provided with a drawing-off opening, and means for forming a central hub to receive the yarn supply during winding, the said means being adapted to be rendered inoperative during unwinding to afford a substantially unobstructed drawing-off space within the center of the yarn-supply.

2. In combination, a bobbin carriage for twist lace machines having a cage, a bobbin rotatably mounted within the cage and comprising independently movable side plates disposed so as to provide a yarn space therebetween, the said bobbin being provided with a drawing-off opening and the central portions of its side plates being relatively movable in a lateral direction, and a hub-projection provided upon one of the said side plates medially thereof and adapted to contact with a part of the other plate when the central portions of both plates are caused to approach each other for winding purposes.

3. In combination, a bobbin carriage for twist lace machines having a cage, a bobbin rotatably mounted within the cage and comprising independently movable side plates disposed so as to provide a yarn space therebetween, the said bobbin being provided with a drawing-off opening and the central portions of its side plates being relatively movable in a lateral direction, and a hub-projection provided upon one of the said side plates medially thereof and adapted to contact with a part of the other plate when the central portions of both plates are caused to approach each other for winding purposes, and means for covering the joint between the said projection and part of the other plate.

4. In combination, a bobbin carriage for twist lace machines having a cage, a bobbin rotatably mounted within the cage and comprising independently movable side plates disposed so as to provide a yarn space therebetween, the said bobbin being provided with a drawing-off opening and the central portions of its side plates being relatively movable in a lateral direction, and a hub-projection provided upon one of the said side plates medially thereof and adapted to contact with a part of the other plate when the central portions of both plates are caused to approach each other for winding purposes, the second-named plate being provided with a socket for the reception of the projection on the first plate when the said projection is in contact with the said part of the second plate.

5. In combination, a carriage for twist lace machines having a cage, a mounting device fitting removably within the cage, and a bobbin mounted rotatably in the said mounting device.

6. In combination, a carriage for twist lace machines having a cage, and a verge in said cage, an annular mounting device fitting removably within the cage and having an external groove adapted to embrace the said verge in applied position, and a bobbin rotatably fitting in the said mounting device.

7. In combination, a carriage for twist lace machines having a cage, an annular mounting device fitting removably within the cage and having an internal bearing, and a bobbin comprising side plates journaled in the bearing of the said mounting device.

8. In combination, a carriage for twist lace machines having a cage, a mounting device fitting removably within the cage, and a rotatable bobbin fitting removably within the said mounting device.

9. In combination, a bobbin carriage for twist lace machines having a cage, a bobbin rotatably mounted within the cage and comprising independently movable side plates disposed so as to provide a yarn space therebetween, the said bobbin being provided with a drawing-off opening and having openings in its side plates for the reception of a winding spindle, and means for forming a central hub to receive the yarn supply during winding, the said means being adapted to be rendered inoperative during unwinding to afford a substantially unobstructed drawing-off space within the center of the yarn supply, the bobbin being adapted to remain stationary in the carriage during unwinding.

10. In combination, a bobbin carriage for twist lace machines having a cage, a bobbin mounted in the said cage and comprising side plates of flexible material disposed so as to provide a yarn space therebetween to permit compression during winding.

11. In combination, a bobbin carriage for twist lace machines having a cage, a bobbin mounted in the said cage and comprising side plates of flexible material disposed so as to provide a yarn space therebetween, the said plates being constructed so that their central portions are normally sunken inwardly with respect to the outer edges thereof to allow for expansion during unwinding.

12. A bobbin and carriage for twist lace machines, the bobbin consisting of two independent circular plates rotatably mounted in the carriage, and a plate located intermediately of the bobbin plates and arranged so that the thread may—during withdrawal—pass between said plate and one of the bobbin plates.

13. A bobbin and carriage for twist lace machines, the bobbin consisting of two independent circular plates rotatably mounted in the carriage, a plate located intermediately of the bobbin plates and arranged so that the thread may—during withdrawal—pass between said plate and one of the bobbin plates, and means for varying the tension or pressure applied to the drawing off thread between the middle plate and bobbin side.

14. In combination, a bobbin carriage for twist lace machines having a cage, a bobbin rotatably mounted within the cage and comprising independently movable side plates disposed so as to provide a yarn space therebetween and to permit the thread to be drawn-off from the center of the supply, and said plates being adapted to remain stationary during drawing-off, and means for sustaining the coils of wound yarn within the bobbin to prevent internal collapse during drawing-off.

15. In combination, a bobbin carriage for twist lace machines having a cage, a bobbin rotatably mounted within the cage and comprising independently movable side plates disposed so as to provide a yarn space therebetween and to permit the thread to be drawn-off from the center of the supply, and said plates being adapted to remain stationary during drawing-off, and engaging portions provided interiorly upon the said plates throughout the yarn-supply space for engagement with the coils of wound yarn to sustain the same and to prevent internal collapse during drawing-off.

16. In a bobbin and carriage for twist lace machines, a mounting case for the bobbin consisting of two rings fastened together so that they overlap the peripheral edges of the bobbin plates, a recess or groove in the lower and upper portions of said case to respectively engage the projecting verge and be engaged by the spring nib of the carriage and means to prevent rotation of the mounting case in the carriage.

In testimony whereof we have signed our names to this specification in the presence of two subscribing witnesses.

FREDERICK WILLIAM PARE.
ALBERT HENRY CLARK.

Witnesses:
HENRY AUSTIN,
ARTHUR ERNEST MOUNTENEY.

Copies of this patent may be obtained for five cents each, by addressing the "Commissioner of Patents, Washington, D. C."